(12) United States Patent
Natanzon (10) Patent No.: US 10,496,601 B1
(45) Date of Patent: Dec. 3, 2019

(54) EFFICIENT FILE SYSTEM PARSING USING SNAP BASED REPLICATION

(71) Applicant: EMC IP Holding Company LLC, Hopkinton, MA (US)

(72) Inventor: Assaf Natanzon, Tel Aviv (IL)

(73) Assignee: EMC IP Holding Company LLC

( * ) Notice: Subject to any disclaimer, the term of this patent is extended or adjusted under 35 U.S.C. 154(b) by 5 days.

(21) Appl. No.: 15/727,867

(22) Filed: Oct. 9, 2017

(51) Int. Cl.
*G06F 3/06* (2006.01)
*G06F 16/11* (2019.01)
*G06F 11/14* (2006.01)
*G06F 16/188* (2019.01)

(52) U.S. Cl.
CPC ............ *G06F 16/128* (2019.01); *G06F 3/065* (2013.01); *G06F 3/0619* (2013.01); *G06F 3/0685* (2013.01); *G06F 11/1451* (2013.01); *G06F 16/188* (2019.01); *G06F 2201/84* (2013.01)

(58) Field of Classification Search
CPC ...... G06F 3/0619; G06F 3/065; G06F 3/0685; G06F 11/1451; G06F 17/30088; G06F 17/30233; G06F 2201/84
See application file for complete search history.

(56) References Cited

U.S. PATENT DOCUMENTS

| | | | | |
|---|---|---|---|---|
| 8,190,836 B1* | 5/2012 | Zheng | ................... | G06F 3/0608 711/162 |
| 8,271,447 B1* | 9/2012 | Natanzon | ............ | G06F 11/1471 707/655 |
| 9,135,118 B2* | 9/2015 | Skillcorn | ............ | G06F 11/1448 |
| 10,019,194 B1* | 7/2018 | Baruch | .................... | G06F 3/065 |
| 10,133,874 B1* | 11/2018 | Natanzon | ............ | G06F 21/6218 |
| 10,140,039 B1* | 11/2018 | Baruch | .................... | G06F 3/0619 |
| 10,146,961 B1* | 12/2018 | Baruch | .................... | G06F 21/78 |
| 10,191,687 B1* | 1/2019 | Baruch | .................... | G06F 3/065 |
| 10,235,060 B1* | 3/2019 | Baruch | ................. | G06F 3/0619 |
| 10,235,061 B1* | 3/2019 | Natanzon | ............ | G06F 3/0619 |
| 10,235,091 B1* | 3/2019 | Ayzenberg | .............. | G06F 3/065 |
| 10,250,679 B1* | 4/2019 | Natanzon | ............ | H04L 67/1095 |
| 2010/0312783 A1* | 12/2010 | Brady | ............... | G06F 17/30088 707/769 |
| 2011/0078682 A1* | 3/2011 | Doan | .................. | G06F 9/45537 718/1 |
| 2016/0124665 A1* | 5/2016 | Jain | ....................... | G06F 3/0619 711/162 |

* cited by examiner

*Primary Examiner* — Larry T MacKall
(74) *Attorney, Agent, or Firm* — Womble Bond Dickinson (US) LLP (57) ABSTRACT

Systems and methods are disclosed for efficiently performing backups using snapshots. A splitter receives write operations and replicates the write operations to a data protection appliance and to a primary storage. The data embodied in the replicated writes is stored in a high-speed storage in a snapshot over a time increment. The snapshot represents data blocks that have changed since a previous time increment. A list of changed blocks is kept in high-speed storage that corresponds to the snapshot blocks. The snapshot blocks are associated with files and file system structure by (a) traversing a file system structure (FSS) for a file system or (b) by traversing the list of changed blocks and looking up changed blocks that are in inode format in the FSS, an inode tree structure, or directly. The snapshot, list of changed blocks, and list of associated changed files are transferred from high-speed storage to backup storage.

18 Claims, 6 Drawing Sheets

EFFICIENT FILE SYSTEM PARSING USING SNAP BASED REPLICATION

TECHNICAL FIELD

This disclosure relates to the field of backing up data from a virtual machine to a backup server using snapshots.

BACKGROUND

A virtual machine in a virtual computing infrastructure can run on a host device that comprises physical hardware and virtualization software. One or more applications that can run within the virtual machine can generate data that may be stored on one or more virtual disks. In many cases, when backing up a virtual machine, it is desirable to parse the list of the changed files to build a catalog of changed files. This is true even if the backup of the virtual machine is a full virtual machine backup, backing up the virtual machine at the block level. However, parsing a file system with a large plurality of files requires substantial computing resources such as processor time and storage cycles (input/outputs, or I/Os). One option is to have a driver inside the virtual machine which tracks the changed files but customers usually do not like to install such drivers.

In addition, even if a storage appliance is designed to support snapshot-based backups, a substantial amount of I/O's are used in generating the snapshots and in traversing a file system to determine file associations and structure for the changed blocks in the snapshots, this is especially true for virtual machine snapshots in a virtual machine file system (VMFS) because some storage arrays do support performing snapshots, but usually not at a virtual machine level. The substantial number of disk I/O's required to perform snapshot-based backups, if a storage appliance supports them at all, can negatively impact performance of the storage appliance. Further, the longer a snapshot backup takes, the less often a snapshot-based backup can be performed.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following detailed description of embodiments, reference is made to the accompanying drawings in which like references indicate similar elements, and in which is shown by way of illustration manners in which specific embodiments may be practiced. These embodiments are described in sufficient detail to enable those skilled in the art to practice the invention, and it is to be understood that other embodiments may be utilized and that logical, mechanical, electrical, functional and other changes may be made without departing from the scope of the present disclosure. The following detailed description is, therefore, not to be taken in a limiting sense, and the scope of the present invention is defined only by the appended claims.

Systems and methods are disclosed for efficiently generating and transferring a snapshot of a file system, on a storage appliance, to a backup storage. A splitter module replicates write operations received from a virtual machine host. The splitter module can be positioned within the virtual machine, within the virtual machine host, in a primary storage to which the virtual machine host writes, or other location. The replicated writes are first sent to a data protection appliance to generate a snapshot of changed data blocks since a previous snapshot. The data protection appliance may be implemented as a virtual machine on a protection storage appliance, such as EMC® Data Domain® storage appliances. The replicated write operation is also sent to a primary storage, or production virtual machine disk, that stores the data embodied in the replicated write operation. The data protection module on the protection storage appliance writes the data block of the replicated write operation to a snapshot file called a differential virtual machine disk, for a time, e.g. $t_2$ to $t_3$ (a second snapshot). The data blocks written to this snapshot represent data blocks that have changed since a time $t_2$. A separate differential virtual machine disk stores the data blocks that changed during a time $t_1$ to $t_2$ (a first snapshot). For each of the differential virtual machine disks, there is a corresponding journal file that lists the metadata of the changed blocks stored in each differential virtual machine disk. At a time, such as $t_3$, the changed data blocks in the differential virtual machine disk, which holds the changed blocks from time $t_2$ to $t_3$, are transferred to a backup storage. The replicated write operations received from the splitter are not received in an order that represents a file structure. Thus, to transfer the changed blocks to backup storage in a manner that associates changed blocks with a file system, the changed blocks must somehow be mapped to a file system structure, such as via a file system structure for the file system. In virtual machines the system usually builds a block device. On the block device there is a virtual machine file system (VMFS) which contains files which are virtual machine disks (VMDKs), and each such virtual machine disk file is attached to a virtual machine, which sees the disk as a block device, and puts a file system on this disk (for example windows VM will put NTFS file system, or Ext4 for Linux). When we backup a virtual machine disk, it is treated as block device. A splitter intercepts new I/Os of the virtual machine, which are I/Os to the block device which is the virtual machine disk VMDK. Differentials are written to a temporary storage (snapshot) to a thin device on a fast storage, for, e.g., a time between $t_1$ and $t_2$. The changed blocks correspond to changed files in the file system. There are at least two ways to determine the changed files that correspond to the changed blocks in the snapshot.

In a first embodiment, changed blocks can be associated with file names by traversing the directory structure of a file system structure (FSS) of a file system. Traversal can be, e.g., by a depth-first search of the directory structure. During the traversal, if an inode of a file or directory is found in a list of changed blocks of a snapshot stored in high-speed storage, that indicates that the file or directory has changed since the last snapshot. If the inode is found in the list of changed blocks, then the FSS can be traversed from the inode to determine the name of a file, or files, that have changed in the directory since the last snapshot. If the inode is not found in the list of changed blocks, then the inode is not traversed, and inodes below the inode are not traversed. Each block corresponding to an inode can be looked up in the list of changed blocks in high-speed storage corresponding to the snapshot to determine if that block has changed. File data and directory structure data associated with the file can be stored for use during transfer of the changed blocks in the snapshot to backup storage. In an embodiment, changed blocks of a file that appear in the list of change blocks in the snapshot can be marked as having being identified to a file. When the traversal of the FSS has finished, a list of changed files and their associated directory structure, and mapping to changed blocks in the list of changed blocks and snapshot, will have been determined. Then, a transfer of the snapshot of changed data blocks can proceed using the file system structure obtained from the traversal.

As can be seen, above, a great number of input/output (I/O) operations may occur during the above process. There are several features disclosed herein that can be used to increase efficiency. First, the "depth" portion of a depth-first traversal of the FSS can be stopped when an inode indicates that it has not changed since the previous snapshot. Second, the snapshot and list of changed blocks can be generated directly into a high-speed storage, such as random access memory, flash, or other high-speed storage. After the changed blocks, list of changed blocks and associated file names have been transferred from high-speed storage to backup storage, any files that may have been generated in high-speed storage during the transfer process can optionally be deleted from high-speed storage. A substantial efficiency gain comes from the fact that we know that if an inode is not in the high-speed storage then the inode has not changed and thus we do not need to read it from disk.

In a second embodiment, the list of changed blocks in high-speed storage can be traversed. If a traversed block in the list of changed blocks is in inode format, then the inode can be looked up in file system structure (FSS), such as in an inode tree structure, or looked up directly by inode number, to determine the files and/or directories beneath the inode that have changed. File and directory structure information can be gathered during the traversal of the inodes beneath the looked up inode. File data and directory structure data associated with the file can be stored for use during transfer of the changed blocks in the snapshot. If an inode for a file or directory indicates that the file or directory has not changed since the last snapshot, no traversal of the file system structure is performed for that inode. When the traversal of the list of changed blocks in high-speed storage has finished, a list of changed files and their associated directory structure, and mapping to changed blocks in the list of changed blocks and snapshot, will have been determined. Then, a transfer of the snapshot of changed data blocks can proceed. To increase efficiency, a "depth" portion of a depth-first traversal of the directory in the file system structure can be stopped when an inode indicates that it has not changed since the previous snapshot. The snapshot, list of changed blocks, and list of changed files, can be transferred from the high-speed storage, such as random access memory, flash, or other high-speed storage, to backup storage. In an embodiment, at least a portion of the FSS can be moved to high-speed storage as well to further reduce disk I/O's. After the snapshot, list of changed blocks, and list of associated file names has been transferred to backup storage, any files that may have been moved to high-speed storage during the transfer process can be deleted from high-speed storage.

Any of the above methods can be embodied on a non-transitory computer-readable medium programmed with executable instructions that, when executed, perform the method. A system can be programmed with executable instructions that, when executed by a processing system, can perform any of the above methods.

Some embodiments include one or more application programming interfaces (APIs) in an environment with calling program code interacting with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code. At least certain embodiments include an environment with a calling software component interacting with a called software component through an API. A method for operating through an API in this environment includes transferring one or more function calls, messages, other types of invocations or parameters via the API.

Figure 1:
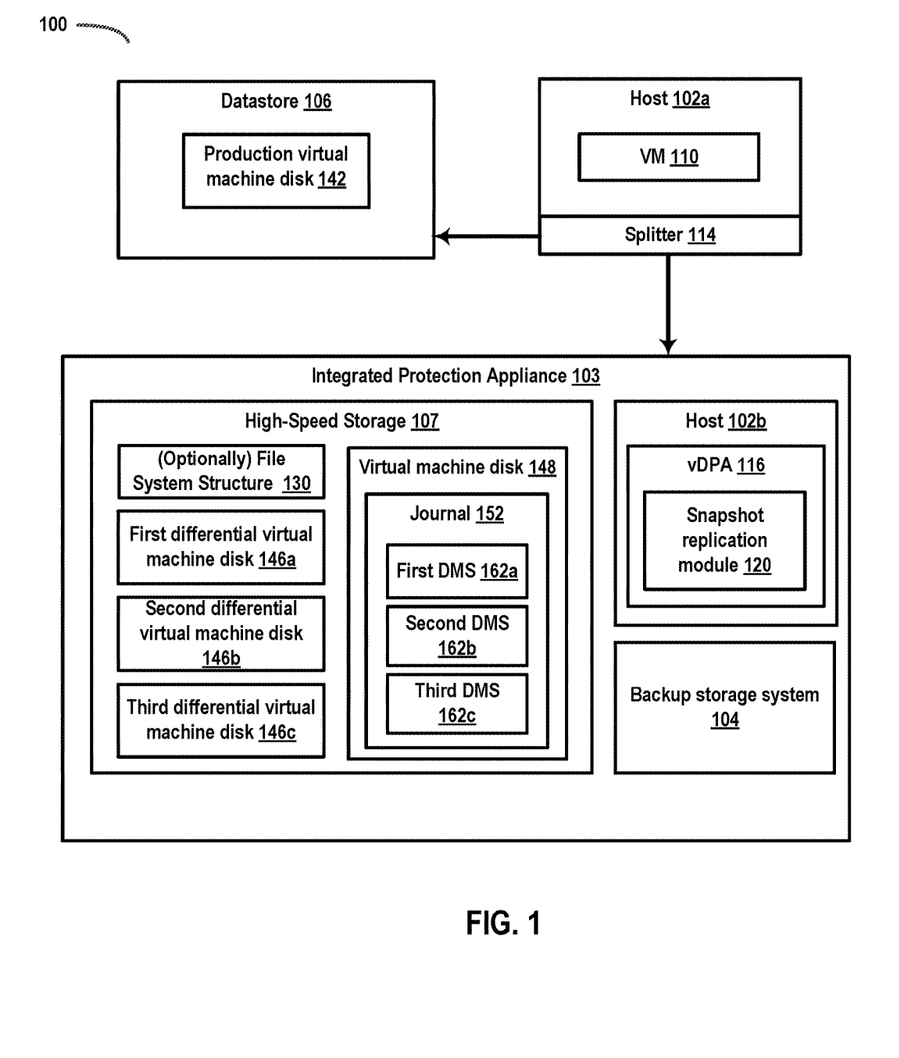
FIG. 1 illustrates, in block form, a data protection system to perform snapshot replication on a storage system not configured to support snapshot replication, according to an embodiment of the disclosure, according to some embodiments.

FIG. 1 illustrates, in block form, a data protection system 100. System 100 is an example of a data protection system (DPA) to perform snapshot replication on a storage system, according to an embodiment of the disclosure.

System 100 includes a host 102a, an integrated protection appliance (IPA) 103 and a datastore 106 that can include one or more production virtual machine disk(s) 142 that store data received from a virtual machine (VM) 110. A production virtual machine disk 142 can include a mapping of a virtual machine file system, exposed to the VM 110, to one or more logical unit numbers (LUNs) of datastore 106. A virtual machine file system (VMFS) contains files which are virtual machine disks VMDKs, and each such virtual machine disk file is attached to a virtual machine 110, which sees the virtual machine disk 142 as a block device, and puts a file system on this virtual machine disk 142. For example, Windows VM will put an NTFS file system on the production virtual machine disk 142.

Host 102a can include computing resources (not shown), such as hardware, an operating system, and a hypervisor, that support one of more virtual machine(s) 110. Hardware (not shown) can include one or more hardware processors, memory, non-volatile storage, network interface(s), and other hardware to support virtual machine(s) 110. An example computing system for host 102a is described below with reference to FIG. 6. Host 102a can also include a splitter 114. Splitter 114 can intercept a write request from VM 110 to write data to production virtual machine disk 142. Splitter 114 can replicate the write request to both the production virtual machine disk 142 and send it to vDPA 116 of IPA 103. vDPA 116 can write the data contained in the intercepted write request to a differential virtual machine disk 146 in high-speed storage 107. vDPA 116 can also write the metadata data associated with the intercepted write to delta marker stream (DMS) 162 in high-speed storage 107. In an embodiment, host 102a can be a hypervisor and the splitter 114 can run either in the hypervisor kernel or in another layer in the hypervisor such as VMWare VAIO, which allows the splitter 114 to intercept I/Os arriving at virtual machine disks (VMDKs) 142. In an embodiment, one or more of the hosts 102a can be VMWARE® ESXI® servers.

Integrated protection appliance 103 can include a host 102b, a backup storage 104 and a high-speed storage 107. High-speed storage 107 includes the first, second, and third differential virtual machine disks 146a . . . 146c and a virtual machine disk 148, which further includes a journal 152. Journal 152 contains delta marker streams (DMS) 162a . . . 162c in high-speed storage 107. In an embodiment, high-speed storage 107 can comprise high-speed random access memory (RAM) or other high speed memory such as 3D Crosspoint (3DXP). 3DXP is a non-volatile memory technology by Intel® and Micron Technology®, that is a bit storage based on a change of bulk resistance, in conjunction with a stackable cross-gridded data access array. In some embodiments, system 100 allows backup and protection of data into the backup storage 104 without any disruption to the production work, e.g., by writing to the production virtual machine disk 142 by the host 102a.

Host 102b of IPA 103 can contain a virtual data protection appliance (vDPA) 116 that implements logic for generating a snapshot using writes received from splitter 114. Host 102b can be a virtual machine within integrated protection appliance 103. vDPA 116 can include a snapshot replication module 120. Responsive to IPA 103 receiving a write request from splitter 114, snapshot replication module 120 can write the data of the received write request to one of the differential virtual machine disks, 146a . . . 146c in high-speed storage 107. Snapshot replication module 120 can also write metadata to a delta marker stream 162a . . . 162c, corresponding to the differential virtual machine disk 146a . . . 146c to which the received data was written. Delta marker streams 162a . . . 162c of journal 152 each can include metadata that lists the locations that may be different between one differential virtual machine disk 162 and another differential virtual machine disk 162. Journal 152 does not include the data changes; but rather, the metadata of the changes. The data of the changes are stored in the differential virtual machine disks 146a . . . 146c.

High-speed storage 107 of IPA 103 can include virtual machine disk 148, differential virtual machine disks 146a . . . 146c, and optionally a copy of the file system structure (FSS) 130 of production virtual machine disk 142. FSS 130 can be an inode tree structure corresponding to a file system of VM 110. FSS 130 can contain file and directory names, storages structure, such as parent and child inode references, and other metadata. Virtual machine disk 148 can include journal 152 that contains DMS 162a . . . 162c. Differential virtual machine disks 146a . . . 146c are called differential virtual machine disks (Δvmd) because each is used to store differential snapshot data. The differential virtual machine disks 146a . . . 146c may hold copies of the changes that happened to production virtual machine disk 142. In an embodiment, the first differential virtual machine disk 146a may include the writes that occurred to the first production virtual machine 142 from time $t_1$ to time $t_2$, the second differential virtual machine disk 146b may include the changes that occurred to the production virtual machine disk 142 from time $t_2$ to time $t_3$, and the third differential virtual machine disk 146c may include changes that occurred to the production virtual machine disk 142 from time $t_3$ to time $t_4$. In an embodiment, the differential virtual machine disks 146a . . . 146c are thin provisioned. In an embodiment, differential virtual machine disks 146a . . . 146c and the virtual machine disk 148 may be stored in a different datastore than production virtual machines disk 142, so that writes and reads arriving to the differential virtual machine disks 146a . . . 146c will have no effect on production performance.

Figure 2:
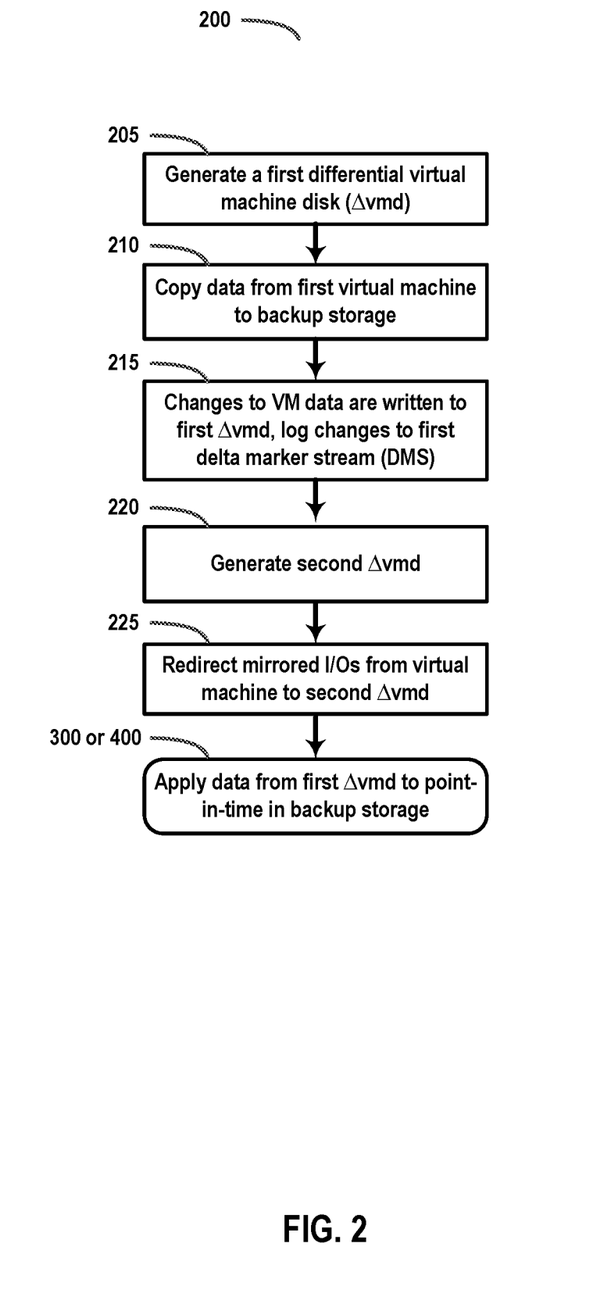
FIG. 2 illustrates, in block diagram form, a method of generating an initial snapshot of a production virtual machine disk for transfer to a backup storage, in accordance with some embodiments.

FIG. 2 illustrates, in block diagram form, a method 200 of generating an initial snapshot into a backup storage, in accordance with some embodiments.

In operation 205, a first differential virtual machine disk ($\Delta vmd_1$) 146a is generated. In an embodiment, $\Delta vmd_1$ is generated on disk storage. For example, the vDPA 116 generates a $\Delta vmd_1$ 146a that will include changes to data blocks of production virtual machine disk 142, the changed data blocks in $\Delta vmd_1$ each having a corresponding delta marker stream (DMS) journal entry, 162a. In an embodiment, the first differential virtual machine disk 146a is thin provisioned.

In operation 210, data is copied from a first virtual machine storage 142 to a backup storage (104). For example, the vDPA 116 copies data of the first VM 110 (i.e. reading data from production virtual machine disk 142) into the backup storage 104.

In operation 215, changes to the data on the first virtual machine are written to the first differential virtual machine disk 146a. For example, vDPA 116 writes changes to the virtual machine 110 to the first differential virtual machine disk 146a. In an embodiment, splitter 114 intercepts the write I/O commands which are sent to the production virtual machine disk 142, replicates the writes, and sends them to vDPA 116. vDPA 116 marks the metadata of changed location in the DMS 162a in the high-speed storage 107 (e.g., the offset and the volume of the writes), and acknowledges the I/Os. Splitter 114 writes the I/O to the production virtual machine disk 142 and asynchronously vDPA 116 writes the data arriving from the splitter 114 to the first differential virtual machine disk 146a.

In operation 220, a new, second, differential virtual machine disk is generated. In an example, vDPA 116 generates a second differential virtual machine disk 146b. In an embodiment, the second differential virtual machine disk 146b is thin provisioned.

In operation 225, splitter 114 redirects replicated write I/Os from virtual machine 110 to the second thin-provisioned differential virtual machine disk 146b. For example, the splitter 114 sends the I/O to vDPA 116a, and once vDPA 116a acknowledges the I/O, the splitter 114 sends the I/O to production virtual machine disk 142. vDPA 116 then asynchronously writes the I/O to the second differential virtual machine disk 146b, and tracks the metadata of the I/O in the second DMS 162b.

In operation 300 or 400, described below with reference to FIGS. 3 and 4, data from the first differential virtual machine disk 146a is written to point in-time backups in backup storage 104. For example, vDPA 116 applies data from the first differential virtual machine disk 146a to a point-in-time in backup storage 104, e.g., vDPA 116 reads the list of changed locations from the first DMS 162a and, for each changed location, vDPA 116 reads the changes from first differential virtual disk 146a and write the changes to backup storage system 104.

Figure 3:
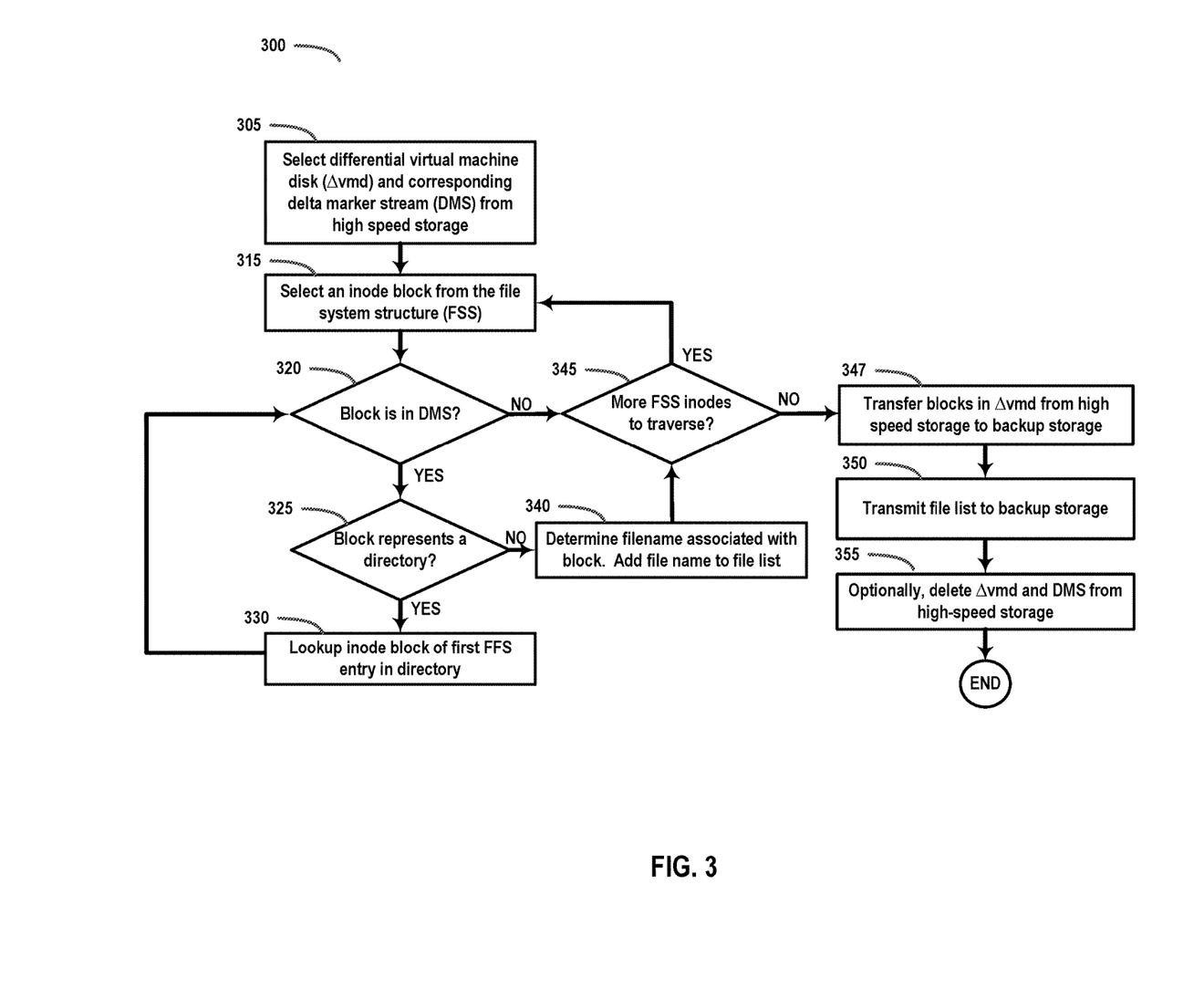
FIG. 3 illustrates, in block diagram form, a method of generating a snapshot of changes to a production virtual machine disk, according to some embodiments.

FIG. 3 illustrates, in block diagram form, a method 300 of transferring a snapshot of changes for a production virtual machine disk 142 to a backup storage 104, according to some embodiments. In method 300, the snapshot is transferred to backup storage 104 after scanning the file system of VM 110. Scanning the file system can include traversing a file system structure (FSS) 130 of the file system that contains file names, directory names, inode references, pointers to parent and child nodes, and other file system structure. As the file system is scanned, when branching to another directory inode, the inode pointed to is checked to see if it is in the list of blocks in DMS 162 in high-speed storage that have changed. The changed data blocks are stored in the differential virtual machine disk (Δvmd) 146, and references to the changed data blocks are stored in the DMS 162. If the inode pointed to has changed, it is read and parsed to determine a file or directory name in the corresponding to the changed block. The file or directory name is added to a list of file names associated with the DMS 162 and Δvmd 146. If the inode pointed to has not changed, this means that the files under the inode were not changed, and the scan of the file system can be stopped for that inode, and can continue to another file or directory (above, and/or over) from the current directory.

In operation 305, a differential virtual machine disk (Δvmd) 146 can be selected, and a delta marker stream (DMS) 162 corresponding to the Δvmd 146 can be selected, to determine the file or directory name(s) associated with the changed blocks to a production virtual machine disk 142 that are stored in Δvmd 146 to be transferred to backup storage 104. The changed data in Δvmd 146 and the metadata in DMS 162 corresponding to the changed data in Δvmd 146 represent changes to data on the production virtual machine disk 142 since a previous transfer of changes to the production virtual machine disk 142, for a file system of a virtual machine 110 on a host 102*a*.

In operation 315, an inode from file system structure 130 corresponding to the file system of VM 110 and production virtual machine disk 142 can be selected for scanning. In an embodiment, the first selected inode from the FSS 130 corresponds to the root of the directory structure of FSS 130.

In operation 320, it can be determined whether the selected inode corresponds to a changed block in DMS 162. The selected inode can refer to a file or a directory. The selected inode can be looked up in the DMS 162 in high-speed storage. If the inode appears in DMS 162, the inode refers to a changed block and method 300 continues at operation 325. Otherwise, the inode does not refer to a changed block and method 300 continues at operation 345. Thus, we need to scan only blocks of the 130 which have changed and not do a read of even one block which has not changed and thus lies on a secondary storage.

In operation 325, the changed block can be looked up in storage to determine whether the block references a directory or a file. If the block represents a directory then method 300 continues at operation 330, otherwise method 330 continues at operation 340.

In operation 330, the changed block represents a changed directory. An inode of a first file or directory under the changed block can be looked up in DMS 162 in high-speed storage 107. Method 300 continues at operation 320.

In operation 340, the determined file name can be associated with the changed block and added to a list of changed files for later transmission from high-speed storage 107 to the backup storage 104. Method 340 continues at operation 345.

In operation 345, it can be determined whether there are any more 130 inodes to traverse in the current directory. If so, then method 300 continues at operation 315, otherwise method 300 continues at operation 347.

In operation 347, Δvmd 146 and DMS 162 can be transferred from high-speed storage 107 to backup storage 104.

In operation 350, the list of changed files corresponding to the changed blocks referenced in DMS 162 and the changed blocks stored in Δvmd 146 can be transferred to the backup storage 104.

In operation 355 Δvmd 146 and DMS 162 can optionally be deleted from high-speed storage 107.

Figure 4:
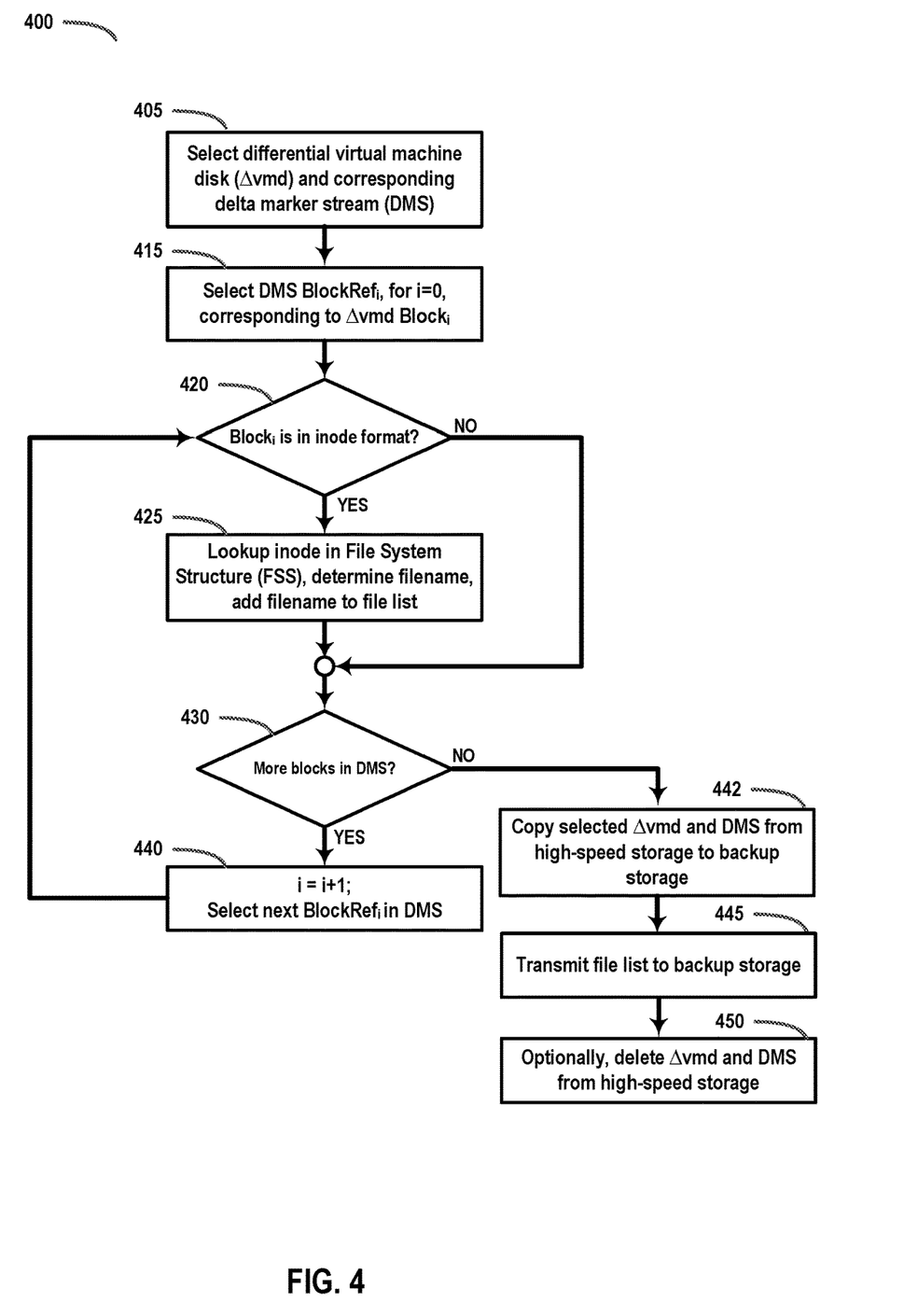
FIG. 4 illustrates, in block diagram form, a method of generating a snapshot of changes to a production virtual machine disk, according to some embodiments.

FIG. 4 illustrates, in block diagram form, a method 400 of transferring a snapshot of changes to a production virtual machine disk 142 from high-speed storage 107 to a backup storage 104, according to some embodiments. In method 400, metadata of the changed blocks in DMS 162 in high-speed storage 107 can be scanned. For each changed block referenced in DMS 162 that is in an inode format, the file or directory corresponding to the changed inode can be looked up in the file system structure (FSS) 130. The FSS 130 can be parsed at the changed inode to determine a file or directory name associated with the changed block.

In operation 405, a differential virtual machine disk (Δvmd) 146 can be selected, and a delta marker stream (DMS) 162 corresponding to the Δvmd 146 can be selected, to use for transferring the changes to a production virtual machine disk 142 from high-speed storage 107 to backup storage 104. The changed data in Δvmd 146 and the metadata in DMS 162 corresponding to the changed data in Δ146 represent changes to data on the production virtual machine disk 142 since a previous transfer of changes to the production virtual machine disk 142, for a file system of a virtual machine 110 on a host 102*a*.

In operation 415, a reference to a first changed block BlockRef$_i$, for i=0, can be selected from DMS 162 in high-speed storage 107. BlockRef$_i$ references a first changed block, Block$_i$, in Δvmd 146 in high-speed storage 107.

In operation 420, it can be determined whether Block$_i$ is in inode format. If so, then method 400 continues at operation 425, otherwise method 400 continues at operation 430.

In operation 425, the inode corresponding to BockRef$_i$ can be looked up in file system structure (FSS) 130. The inode in FSS 130 can be parsed to determine a file or directory name associated with the inode. The file or directory name can be added to a list of file or directory names associated with the metadata in DMS 162 that references changed blocks in Δvmd 146.

In operation 430, it can be determined whether there are any more references BlockRef$_i$ to changed blocks in DMS 162 in high-speed storage 107 that are as yet unprocessed. If so, then method 400 continues at operation 440, otherwise method 400 continues at operation 442. In operation 440, a next BlockRef$_i$, for i=i+1, is selected from DMS 162 in high-speed storage 107. Method 400 continues at operation 420.

In operation 442, Δvmd 146 and DMS 162 can be transferred from high-speed storage 107 to backup storage 104. In operation 445, the list of file names associated with the changed blocks referenced in DMS 162 and stored in Δvmd 146 can be transferred from high-speed storage 107 to backup storage 104.

In operation 450, optionally, the Δvmd 146 and DMS 162 can be deleted from high-speed storage 107.

Figure 5:
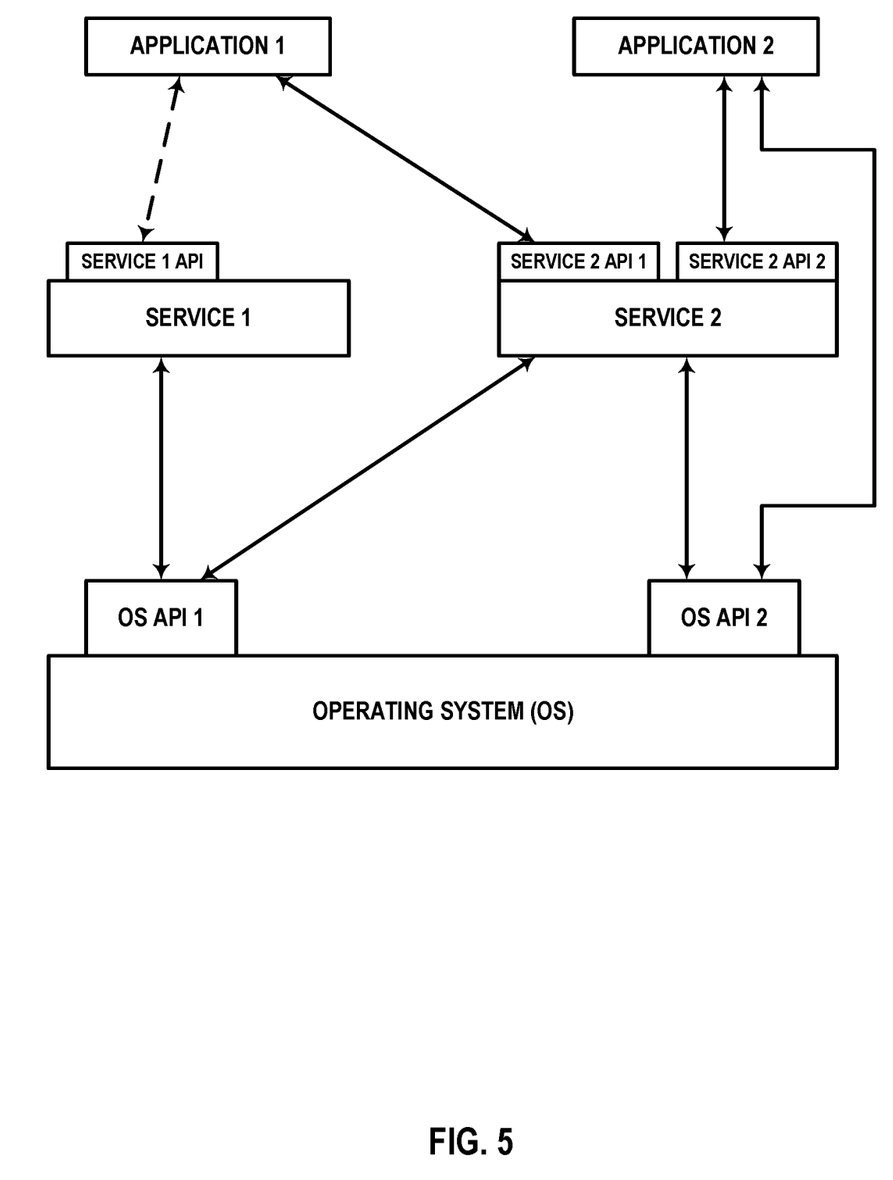
FIG. 5 illustrates an exemplary embodiment of a software stack usable in some embodiments of the invention.

In FIG. 5 ("Software Stack"), an exemplary embodiment, applications can make calls to Services 1 or 2 using several Service APIs and to Operating System (OS) using several OS APIs. Services 1 and 2 can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both as API 1 and OS API 2, Application 2 makes calls to and receives returned values from as API 2.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 6:
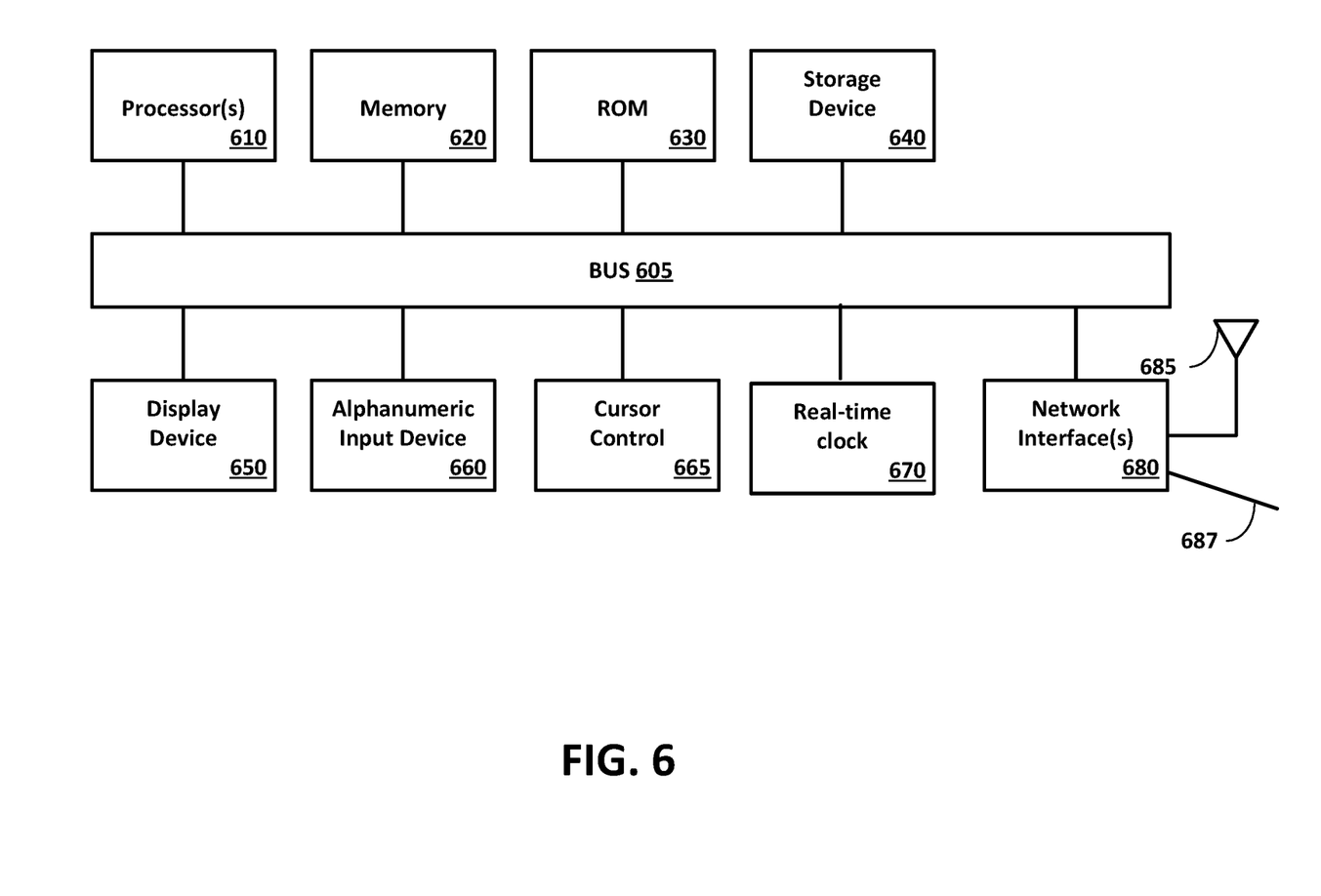
FIG. 6 illustrates, in block diagram form, an exemplary computing system for implementing concepts described herein.

FIG. 6 is a block diagram of one embodiment of a computing system 600. The computing system illustrated in FIG. 6 is intended to represent a range of computing systems (either wired or wireless) including, for example, desktop computer systems, laptop computer systems, cellular telephones, personal digital assistants (PDAs) including cellular-enabled PDAs, set top boxes, entertainment systems or other consumer electronic devices. Alternative computing systems may include more, fewer and/or different components. The computing system of FIG. 6 may be used to provide a computing device and/or a server device.

Computing system 600 includes bus 605 or other communication device to communicate information, and processor 610 coupled to bus 605 that may process information.

While computing system 600 is illustrated with a single processor, computing system 600 may include multiple processors and/or co-processors 610. Computing system 600 further may include random access memory (RAM) or other dynamic storage device 620 (referred to as main memory), coupled to bus 605 and may store information and instructions that may be executed by processor(s) 610. Main memory 620 may also be used to store temporary variables or other intermediate information during execution of instructions by processor 610.

Computing system 600 may also include read only memory (ROM) 630 and/or other static, non-transitory storage device 640 coupled to bus 605 that may store static information and instructions for processor(s) 610. Data storage device 640 may be coupled to bus 605 to store information and instructions. Data storage device 640 such as flash memory, 3D Crosspoint (3DXP), or a magnetic disk or optical disc and corresponding drive may be coupled to computing system 600. 3D Xpoint (3DXP) is a non-volatile memory technology by Intel® and Micron Technology®, that is a bit storage based on a change of bulk resistance, in conjunction with a stackable cross-gridded data access array.

Computing system 600 may also be coupled via bus 605 to display device 650, such as a light-emitting diode display (LED), liquid crystal display (LCD), or touch screen display to display information to a user. Computing system 600 can also include an alphanumeric input device 660, including alphanumeric and other keys, which may be coupled to bus 605 to communicate information and command selections to processor(s) 610. Another type of user input device is cursor control 665, such as a touchpad, a mouse, a trackball, or cursor direction keys to communicate direction information and command selections to processor(s) 610 and to control cursor movement on display 650. Computing system 600 may further include a real-time clock 670. The real-time clock 670 may be used for generating date/time stamps for data records, computing elapsed time, and other time-keeping functions. A real-time clock 670 can be a battery-backed chipset with a settable date and time. Alternatively, a real-time clock 670 may include logic to retrieve a real-time from a network source such as a server or an Internet server via network interfaces 680, described below.

Computing system 600 further may include one or more network interface(s) 680 to provide access to a network, such as a local area network. Network interface(s) 680 may include, for example, a wireless network interface having antenna 685, which may represent one or more antenna(e). Computing system 600 can include multiple wireless network interfaces such as a combination of WiFi, Bluetooth® and cellular telephony interfaces. Network interface(s) 680 may also include, for example, a wired network interface to communicate with remote devices via network cable 687, which may be, for example, an Ethernet cable, a coaxial cable, a fiber optic cable, a serial cable, or a parallel cable.

In one embodiment, network interface(s) 680 may provide access to a local area network, for example, by conforming to IEEE 802.11b, 802.11g, or 802.11n standards, and/or the wireless network interface may provide access to a personal area network, for example, by conforming to Bluetooth® standards. Other wireless network interfaces and/or protocols can also be supported. In addition to, or instead of, communication via wireless LAN standards, network interface(s) 680 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A computer-implemented method comprising:
    generating, in a high-speed storage, a second disk snapshot of blocks of a storage that have changed since a first, previous, snapshot of blocks of the storage;
    generating, in the high-speed storage, a first list of the changed blocks in the second disk snapshot;
    generating a second list of changed files corresponding to the first list of changed blocks by traversing only those blocks of a file system that are identified in the first list of changed blocks contained in high-speed storage;
    transferring the changed blocks from high-speed storage to a backup storage using a differential virtual machine disk;
    transferring metadata identifying each of the one or more files corresponding to the changed blocks from high-speed storage to the backup storage using a delta marker stream; and transferring the second list of changed files from high-speed storage to a backup storage.

2. The method of claim 1, wherein the first and second snapshots are generated from write operations that are replicated asynchronously to both a production virtual machine disk and to a storage appliance having a virtual machine for data protection.

3. The method of claim 1, wherein the high-speed storage comprises at least one of:
  random access memory;
  flash memory; or
  a bit storage based on a change of bulk resistance, in conjunction with a stackable cross-gridded data access array.

4. The method of claim 1 wherein transferring the changed blocks comprises:
  reading the changed blocks from the high-speed storage;
  performing one of:
    (a) arranging the changed blocks in an order determined at least in part by a file system organization; and
      transferring the changed blocks to storage in the determined order;
    or
    (b) transferring the changed blocks to storage; and
      transferring metadata to storage describing an order of the changed blocks based at least in part on the file system organization.

5. The method of claim 1, wherein generating the second list of changed files comprises:
  traversing a file system structure (FSS) of a file system, the FSS having inode entries corresponding to one or more files and a directory structure of the file system;
  in response to determining that an inode of the FSS corresponds to a block in the first list of changed blocks:
    traversing one or more inodes from the inode that corresponds to the changed block, to identify a file name of each of one or more files having changed blocks;
    adding each of the one or more identified files to the second list of changed files corresponding to one or more blocks in the first list of changed blocks.

6. The method of claim 1, wherein generating the second list of changed files comprises:
  traversing the blocks in the first list of changed blocks;
  in response to determining that a traversed block comprises an inode of a file or a directory:
    traversing one or more inodes of the file or directory from the inode that corresponds to the changed block, to identify a file having the changed block;
    adding the identified file to the second list of changed files corresponding to the first list of changed blocks.

7. A non-transitory computer readable medium, programmed with executable instructions that, when executed by a processing system, perform operations comprising:
  generating, in a high-speed storage, a second disk snapshot of blocks of a storage that have changed since a first, previous, snapshot of blocks of the storage;
  generating, in the high-speed storage, a first list of the changed blocks in the second disk snapshot;
  generating a second list of changed files corresponding to the first list of changed blocks by traversing only those blocks of a file system that are identified in the first list of changed blocks contained in high-speed storage;
  transferring the changed blocks from high-speed storage to the backup storage using a differential virtual machine disk;
  transferring metadata identifying each of the one or more files corresponding to the changed blocks from high-speed storage to the backup storage using a delta marker stream; and
  transferring the second list of changed files from high-speed storage to a backup storage.

8. The medium of claim 7, wherein the first and second snapshots are generated from write operations that are replicated asynchronously to both a production virtual machine disk and to a storage appliance having a virtual machine for data protection.

9. The medium of claim 7, wherein the high-speed storage comprises at least one of:
  random access memory;
  flash memory; or
  a bit storage based on a change of bulk resistance, in conjunction with a stackable cross-gridded data access array.

10. The medium of claim 7 wherein transferring the changed blocks comprises:
  reading the changed blocks from the high-speed storage;
  performing one of:
    (a) arranging the changed blocks in an order determined at least in part by a file system organization; and
      transferring the changed blocks to storage in the determined order;
    or
    (b) transferring the changed blocks to storage; and
      transferring metadata to storage describing an order of the changed blocks based at least in part on the file system organization.

11. The medium of claim 7, wherein generating the second list of changed files comprises:
  traversing a file system structure (FSS) of a file system, the FSS having inode entries corresponding to one or more files and a directory structure of the file system;
  in response to determining that an inode of the FSS corresponds to a block in the first list of changed blocks:
    traversing one or more inodes of the FSS from the inode that corresponds to the changed block, to identify a file name of each of one or more files having changed blocks;
    adding each of the one or more identified files to the second list of changed files corresponding to one or more blocks in the first list of changed blocks.

12. The medium of claim 7, wherein generating the second list of changed files comprises:
  traversing the blocks in the first list of changed blocks;
  in response to determining that a traversed block comprises an inode of a file or a directory:
    traversing one or more inodes of the file or directory from the inode that corresponds to the changed block, to identify a file having the changed block;
    adding the identified file to the second list of changed files corresponding to the first list of changed blocks.

13. A processing system, comprising a hardware processor coupled to a memory programmed with executable instructions, that when executed by the processing system, perform operations comprising:
  generating, in a high-speed storage, a second disk snapshot of blocks of a storage that have changed since a first, previous, snapshot of blocks of the storage;

generating, in the high-speed storage, a first list of the changed blocks in the second disk snapshot;

generating a second list of changed files corresponding to the first list of changed blocks by traversing only those blocks of a file system that are identified in the first list of changed blocks contained in high-speed storage;

transferring the changed blocks from high-speed storage to the backup storage using a differential virtual machine disk;

transferring metadata identifying each of the one or more files corresponding to the changed blocks from high-speed storage to the backup storage using a delta marker stream; and transferring the second list of changed files, from high-speed storage to a backup storage.

14. The system of claim 13, wherein the first and second snapshots are generated from write operations that are replicated asynchronously to both a production virtual machine disk and to a storage appliance having a virtual machine for data protection.

15. The system of claim 13, wherein the high-speed storage comprises at least one of:
random access memory;
flash memory; or
a bit storage based on a change of bulk resistance, in conjunction with a stackable cross-gridded data access array.

16. The system of claim 13 wherein transferring the changed blocks comprises:
reading the changed blocks from the high-speed storage;
performing one of:
(a) arranging the changed blocks in an order determined at least in part by a file system organization; and
transferring the changed blocks to storage in the determined order;
or
(b) transferring the changed blocks to storage; and
transferring metadata to storage describing an order of the changed blocks based at least in part on the file system organization.

17. The system of claim 13, wherein generating the second list of changed files comprises:
traversing a file system structure (FSS) of a file system, the FSS having inode entries corresponding to one or more files and a directory structure of the file system;
in response to determining that an inode of the FSS corresponds to a block in the first list of changed blocks:
traversing one or more inodes from the inode that corresponds to the changed block, to identify a file name of each of one or more files having changed blocks;
adding each of for the one or more identified files names to the second list of changed files corresponding to one or more blocks in the first list of changed blocks.

18. The system of claim 13, wherein generating the second list of changed files comprises:
traversing the blocks in the first list of changed blocks;
in response to determining that a traversed block comprises an inode of a file or a directory:
traversing one or more inodes of the file or directory from the inode that corresponds to the changed block, to a file having the changed block;
adding the identified file to the second list changed files corresponding to the first list of changed blocks.

* * * * *